United States Patent
Hosseini et al.

(10) Patent No.: US 11,112,672 B2
(45) Date of Patent: Sep. 7, 2021

(54) OPTICAL DEVICE

(71) Applicant: OXFORD UNIVERSITY INNOVATION LIMITED, Oxford (GB)

(72) Inventors: Peiman Hosseini, London (GB); Harish Bhaskaran, Oxford (GB); Ben Broughton, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 0 days.

(21) Appl. No.: 16/913,178

(22) Filed: Jun. 26, 2020

(65) Prior Publication Data
US 2020/0326565 A1 Oct. 15, 2020

Related U.S. Application Data (63) Continuation of application No. 15/765,946, filed as application No. PCT/GB2016/053196 on Oct. 14, 2016, now Pat. No. 10,718,987.

(30) Foreign Application Priority Data

Oct. 16, 2015 (GB) .................................... 1518371

(51) Int. Cl.
*G02F 1/137* (2006.01)
*G02F 1/19* (2019.01)
*G02F 1/1335* (2006.01)
*G02F 1/01* (2006.01)

(52) U.S. Cl.
CPC ........ *G02F 1/137* (2013.01); *G02F 1/133528* (2013.01); *G02F 1/19* (2013.01); *G02F 1/0147* (2013.01); *G02F 2203/34* (2013.01)

(58) Field of Classification Search
CPC .......... G02F 1/137; G02F 1/19; G02F 1/0147; G02F 1/133528; G02F 2203/34
See application file for complete search history.

(56) References Cited

U.S. PATENT DOCUMENTS 5,364,829 A * 11/1994 Kishimoto ............... B41M 5/28
428/207
2001/0041304 A1* 11/2001 Uno ....................... G11B 7/257
430/270.13
(Continued)

FOREIGN PATENT DOCUMENTS

EP  1717609 A1  11/2006
EP  3203309     8/2017
(Continued)

OTHER PUBLICATIONS

Hosseini, Peiman et al. "An Optoelectronic Framework Enabled by Low-Dimensional Phase-Change Films" Nature, vol. 511, No. 7508, Jul. 10, 2014.
(Continued)

*Primary Examiner* — Mariam Qureshi
(74) *Attorney, Agent, or Firm* — Jason H. Vick; Sheridan Ross, PC (57) ABSTRACT

An optical device comprising a stack of the following layers: a capping layer; a layer of light absorber material; and a reflective layer, wherein the refractive index of the capping layer is at least 1.6.

28 Claims, 8 Drawing Sheets

(56) References Cited

U.S. PATENT DOCUMENTS

| | | | | |
|---|---|---|---|---|
| 2002/0110081 | A1* | 8/2002 | Rijpers | G11B 7/2433 369/284 |
| 2003/0147112 | A1* | 8/2003 | Mukawa | H04N 9/3167 359/15 |
| 2004/0022173 | A1* | 2/2004 | Kondo | G11B 7/00736 369/292 |
| 2005/0007937 | A1* | 1/2005 | Mori | B82Y 10/00 369/275.2 |
| 2010/0225989 | A1* | 9/2010 | Anders | G02F 1/19 359/288 |
| 2011/0249221 | A1 | 10/2011 | Uchida et al. | |
| 2014/0118360 | A1 | 5/2014 | Ma et al. | |
| 2016/0033794 | A1 | 2/2016 | Hone et al. | |
| 2016/0336036 | A1* | 11/2016 | Bhaskaran | G11B 7/24062 |
| 2018/0284497 | A1 | 10/2018 | Hosseini et al. | |

FOREIGN PATENT DOCUMENTS

| | | |
|---|---|---|
| JP | 2007-310081 A | 11/2007 |
| JP | 2007-534968 A | 11/2007 |
| JP | 2009-294659 A | 12/2009 |
| JP | 2012-151081 A | 8/2012 |
| JP | 2013-068964 A | 4/2013 |
| WO | WO 02/082172 | 10/2002 |
| WO | WO 2005/017595 | 2/2005 |
| WO | WO 2015/097468 | 7/2015 |
| WO | WO 2015/097469 | 7/2015 |

OTHER PUBLICATIONS

Kim, H. et al. "Electrical, Optical, and Structural Properties of Indium-Tin-Oxide Think Films for Organic Light-Emitting Devices" Journal of Applied Physics, American Institute of Physics, US, vol. 86, No. 11, Dec. 1, 1999.
International Search Report for International Application No. PCT/GB2016/053196, dated Feb. 27, 2017.
Written Opinion for International Application No. PCT/GB2016/053196, dated Feb. 27, 2017.
International Preliminary Report on Patentability for International Application No. PCT/GB2016/053196, dated Apr. 26, 2018.
Office Action for U.S. Appl. No. 15/765,946, dated Apr. 16, 2019.
Office Action for U.S. Appl. No. 15/765,946, dated Aug. 9, 2019.
Office Action for U.S. Appl. No. 15/765,946, dated Dec. 18, 2019.
Notice of Allowance for U.S. Appl. No. 15/765,946, dated Apr. 1, 2020.
Notification of Reasons for Refusal (including Translation) for corresponding Japanese Patent Application No. 2018-519705, dated May 25, 2021.

* cited by examiner

OPTICAL DEVICE

CROSS REFERENCE TO RELATED APPLICATIONS

This application is a Continuation of U.S. application Ser. No. 15/765,946, filed 4 Apr. 2018, now U.S. Pat. No. 10,718,987, which is a national stage application under 35 U.S.C. 371 of PCT Application No. PCT/GB2016/053196, having an international filing date of 14 Oct. 2016, which designated the United States, which PCT application claimed the benefit of Great Britain Patent Application No. 1518371.8, filed 16 Oct. 2015, the contents of each of which are incorporated herein by reference in their entirety.

The present invention relates to an optical device.

There has been a desire for improved optical devices whose spectral characteristics can be customised, for example for color filters for spectrometry, or for color displays if the device is switchable.

A prior proposal for a device works on the principle of interference using reflection at the opposite surfaces of an optically transmissive layer (i.e. like an etalon); this provide a spectral response (i.e. color) in reflection or transmission. The spectrum (color) can be set by incorporating a layer of light absorber material. If the light absorber material is a phase change material (PCM), then the optical properties of the device can be switched by switching the phase of the PCM.

However, observable color contrast can only be created if ultra-thin PCM layers are used, such as 7 nm. This is problematic if devices are fabricated on rough substrates, such as flexible polymers.

Another idea is to use a liquid crystal material as the switchable element of a display. However, conventional devices need a minimum thickness of 1-2 microns of liquid crystal (depending on the birefringence of the liquid crystal used). This thickness limits the maximum switching speed, as well as using more material, and making the device thicker. Other concepts employ electro-optically active materials, but these usually require very high voltages, such as 10 kV, which are problematic to generate.

The present invention has been devised in view of the above problems.

Accordingly, the present invention provides an optical device comprising a stack of the following layers: a capping layer; a layer of light absorber material; and a reflective layer, wherein the refractive index of the capping layer is at least 1.6.

Another aspect of the invention provides an optical device comprising a stack of the following layers: a capping layer; a layer of light absorber material; a layer of optically active material; and a reflective layer.

Further optional aspects are defined in the dependent claims.

Throughout this specification, the terms 'optical' and 'light' are used, because they are the usual terms in the art relating to electromagnetic radiation, but it is understood that in the context of the present specification they are not limited to visible light. It is envisaged that the invention can also be used with wavelengths outside the visible spectrum, such as infrared and ultraviolet light.

Embodiments of the invention will now be described, by way of example only, with reference to the accompanying drawings in which.

A first embodiment of an optical device will now be described with reference to FIG. 1, which shows schematically a layered structure in cross-section. A solid layer of light absorber material 10 is provided. This layer is also knows as a thin film absorber, and the material typically has an imaginary component of refractive index (k) that is non-zero over a wide range of wavelengths. Many suitable materials can be used, and some specific examples are given later. The layer 10 is generally more than 10 manometers thick. In this specific embodiment, the absorber material is $Ge_2Sb_2Te_5$ (GST).

The absorber material layer 10 is provided on a reflective layer 12 (partially or totally reflective, depending on whether the device is being used in a transmissive mode or not).

In an earlier proposal, a spacer layer would be sandwiched between the absorber layer 10 and the reflective layer 12, and a capping layer of silica or ITO (indium tin oxide) would be provided on the front (top) side of the device. Conventionally, the capping layer didn't contribute to the color performance, and the absorber layer had to be ultra-thin.

In contrast, in this specific embodiment, a material with high refractive index (in this case real component of refractive index; the imaginary component of refractive index should be as small as possible so the material is as transparent as possible) is used as a capping layer 16. The refractive index is greater than 1.6, such as 1.8 or more, and can be more than 2.0 or even 2.2. Examples of materials for the capping layer 16 include $TiO_2$, ZnO, AgO, diamond, $SiO_2$, SiN, and TaO. Light entering the high-refractive index capping layer 16 tends to remain in the layer more than in a conventional device (in the same way that light can be confined in a waveguide, such as an optical fiber). Color is generated through interference with the 'leaky' absorber layer and lower interface. The requirement for an ultra-thin absorber layer is removed. In the case of GST as a PCM comprising the absorber layer 10, when the GST is in the amorphous phase it is less absorbent and the light in the capping layer 16 is less affected; when the GST is in the crystalline phase it is more absorbent (more metallic), and so light leaks at specific wavelengths generating color and color modulation by interference.

A spacer layer (not shown) can still optionally be provided between the layers 10 and 12. If the absorber layer 10 is a PCM, then electrodes can be provided, if required, to switch the phase of the layer (electrically or thermally), i.e. by applying a suitable voltage pulse from a voltage source, the PCM can undergo an induced reversible phase. The reflective layer 12 can act as a bottom electrode (or so could an optional spacer layer, if conductive, such as ITO); and a second electrode (not shown) in contact with the PCM can be provided at the side or on top (between the layers 10 and 16). Alternatively, as described in WO 2015/097468 A1 or EP16000280.4 for example, the PCM layer may be activated by heat pulses supplied by a heating element adjacent to the PCM, or on an opposite side of the mirror layer to the PCM. In this case, the spacer layer may be non-conductive and selected solely for its optical and thermal properties.

Figure 2:
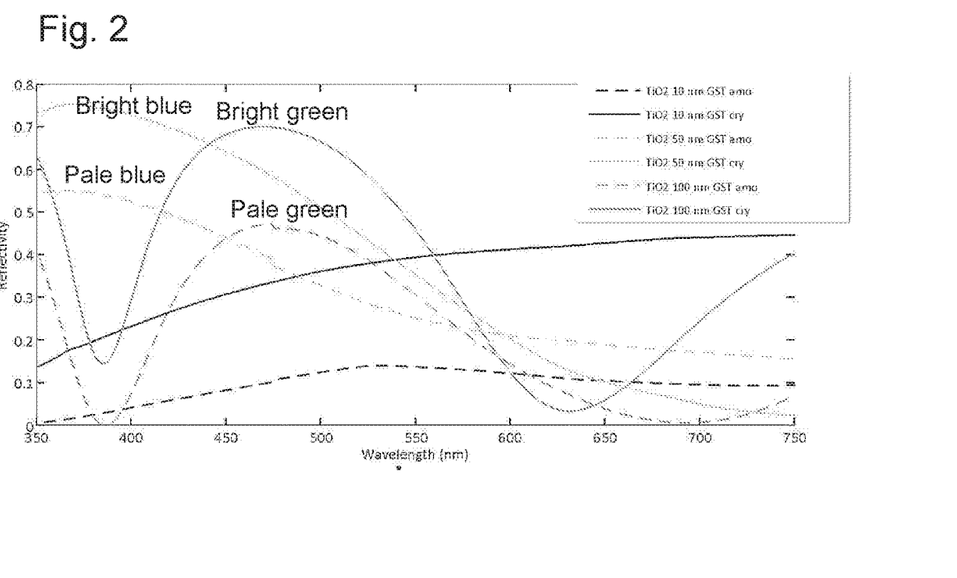
FIG. 2 shows plots of reflectivity against wavelength for devices according to an embodiment of the invention.

FIG. 2 shows examples of spectral responses for devices in which the capping layer 16 of $TiO_2$ is 10, 50 and 100 manometers thick; the dashed lines being when the GST is in the amorphous phase and the solid lines being when the GST is in the crystalline phase. As can be seen in these examples, the color can shift from pale to bright during switching. Using this structure one can create RGB-type pixels in which on state is pale (almost white) and the other state is a bright primary color (such as bright blue, red or green). Using a thinner capping layer 16, the device can have quite a flat spectrum, or so simply be used to switch between bright and dark states of pixels. In all of the examples of FIG. 2, the reflective layer 12 is a 100 nm thick layer of Ag.

The thickness of the absorber layer 10 can itself generate color independently.

Figure 1:
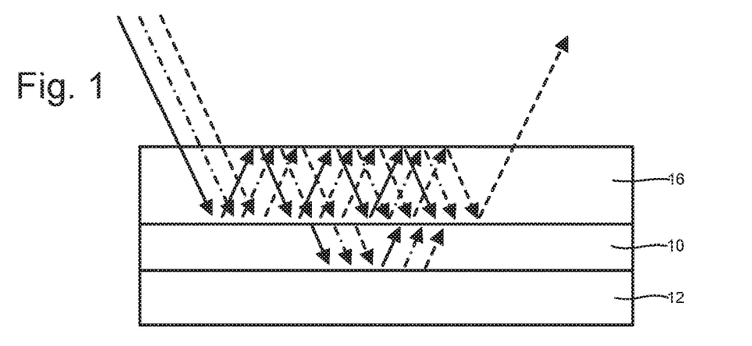
FIG. 1 is a schematic cross-section of a portion of an optical device according to an embodiment of the invention for devices.

The structure of FIG. 1 can easily be integrated with architectures known from PCM memory devices on top of CMOS circuitry by changing the top electrode to the high refractive index layer 16 on top of a thin transparent electrode layer (such as 10 nm ITO).

Figure 3A:
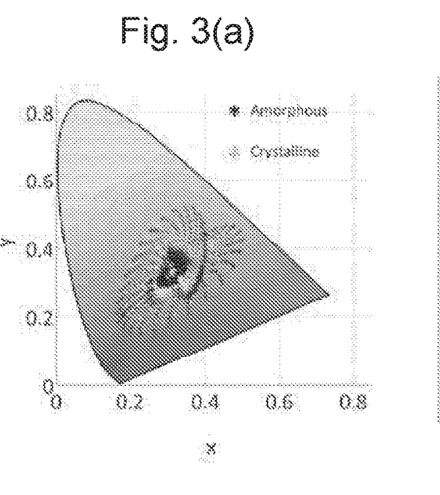
FIGS. 3(a) and 3(b) are chromaticity diagrams showing the color gamut achievable with (a) conventional devices, and (b) devices according to embodiments of the invention.
Figure 3B:
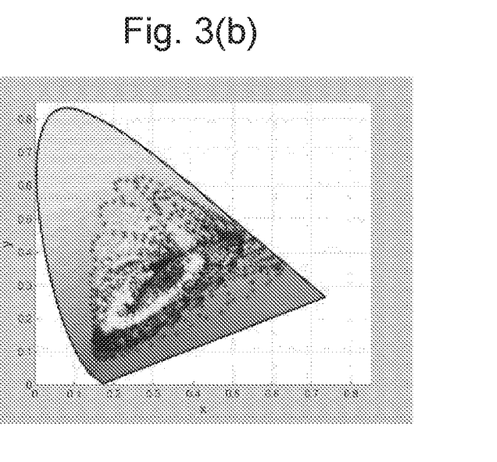

Using devices according to embodiments of the present aspect of the invention, the gamut (range of colors accessible in color space) can be improved dramatically. The points plotted in the chromaticity diagram of FIG. 3(a) show the previously possible gamut using an ITO capping layer, whereas FIG. 3(b) shows the much larger gamut possible with a high-refractive index capping layer 16, in this example the capping layers is diamond (e.g. synthetic diamond grown by CVD).

In further embodiments of the invention, either or both of the spacer layer and capping layer may comprise "composite" layers, which comprise multiple layers of material having different refractive indices. In this way, further partial internal reflections are generated at the interfaces of these multiple layers, providing the possibility of more complex interference modes which may allow increased control of the reflection spectra of the available states. This may include both the ability to generate reflection spectra with high reflectivity over a narrow range of wavelengths, producing more vivid colours and thereby a larger colour gamut, and the ability to more independently tune the desired reflection spectra in the multiple states of the device. Materials which may be used as sub-layers within the composite spacer or capping layer may include (but are not limited to) ZnO, $TiO_2$, $SiO_2$, $Si_3N_4$, TaO and ITO. Example devices with such a composite spacer or capping layer are illustrated in FIGS. 11-15.

Figure 11:
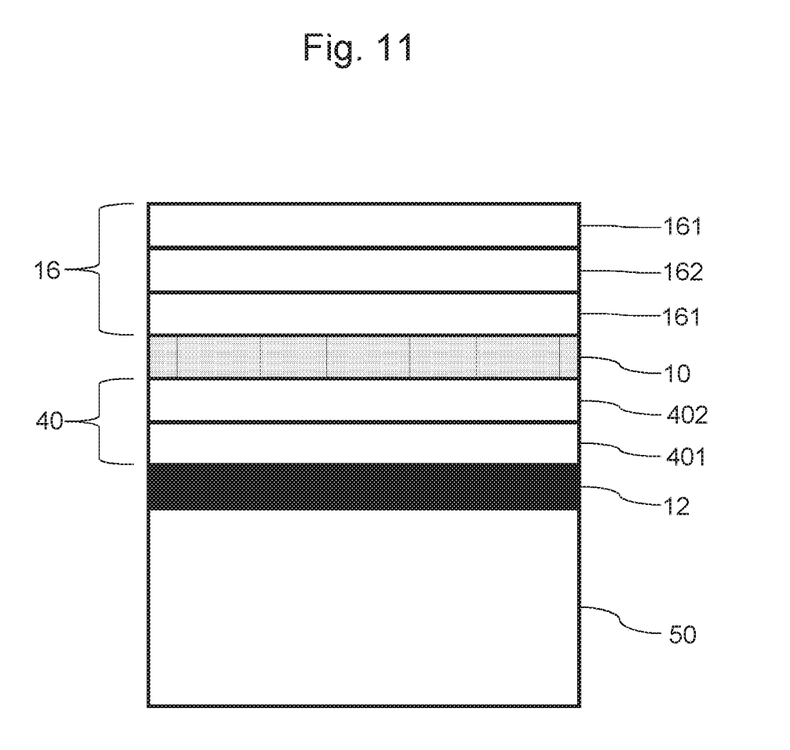
FIG. 11 shows an example stack comprising a capping layer formed from a plurality of capping layer sub-layers and a spacer layer formed from a plurality of spacer layer sub-layers.

FIG. 11 shows an example stack in which the capping layer 16 comprises a plurality of capping layer sub-layers 161-162. At least two of the capping layer sub-layers 161-162 have a different refractive index relative to each other. Typically, at least those capping layer sub-layers which are directly adjacent to each other will have different refractive indices relative to each other. In the particular example shown, the capping layer 16 comprises two capping layer sub-layers 161 of a first refractive index sandwiching a single capping layer sub-layer 162 of a second refractive index, different from the first refractive index, but other configurations are possible. In the example shown a spacer layer 40 is additionally provided between the reflective layer 12 and the layer of light absorber material 10. In this particular example, the spacer layer 40 comprises a plurality of spacer layer sub-layers 401-402. At least two of the spacer layer sub-layers 401-402 have a different refractive index relative to each other. Typically, at least those spacer layer sub-layers which are directly adjacent to each other will have different refractive indices relative to each other. In the particular example of FIG. 11 only two spacer layer sub-layers are provided but other embodiments may comprise more than two spacer layer sub-layers. In this embodiment the stack is formed starting from a substrate 50 beneath the reflective layer 12. As discussed below with reference to FIG. 15, this is not essential. The stack could also be formed in the reverse order starting from an optically thick cover layer 70 above the capping layer 16 (in which case a substrate 50 beneath the reflective layer is optional).

Figure 12:
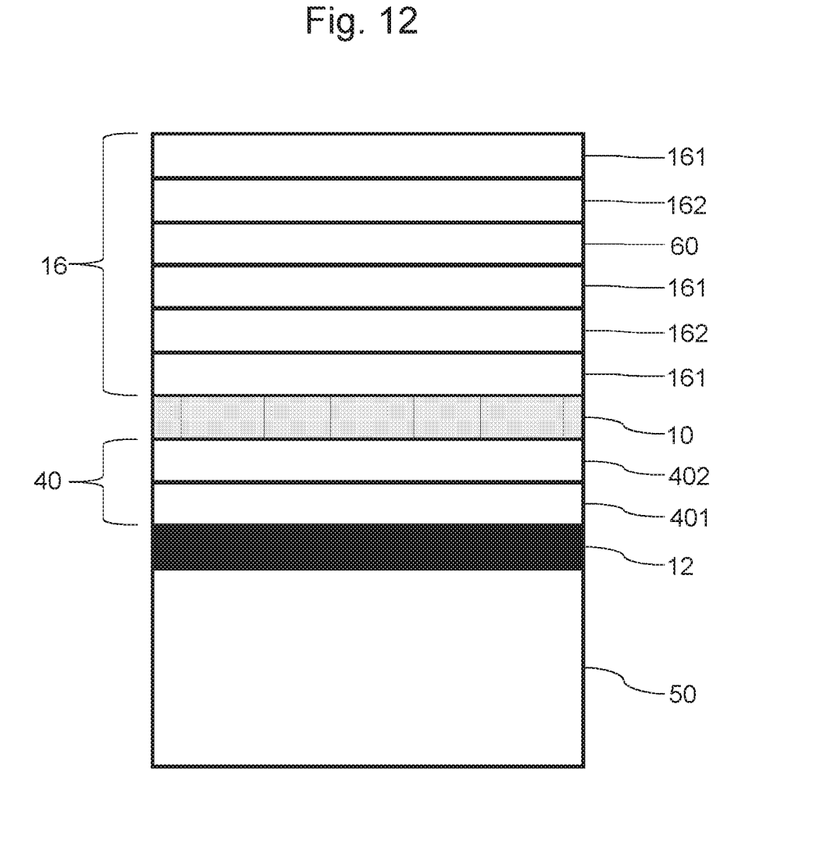
FIG. 12 shows an example stack comprising a layer of passive light absorber material provided within a capping layer.
Figure 13:
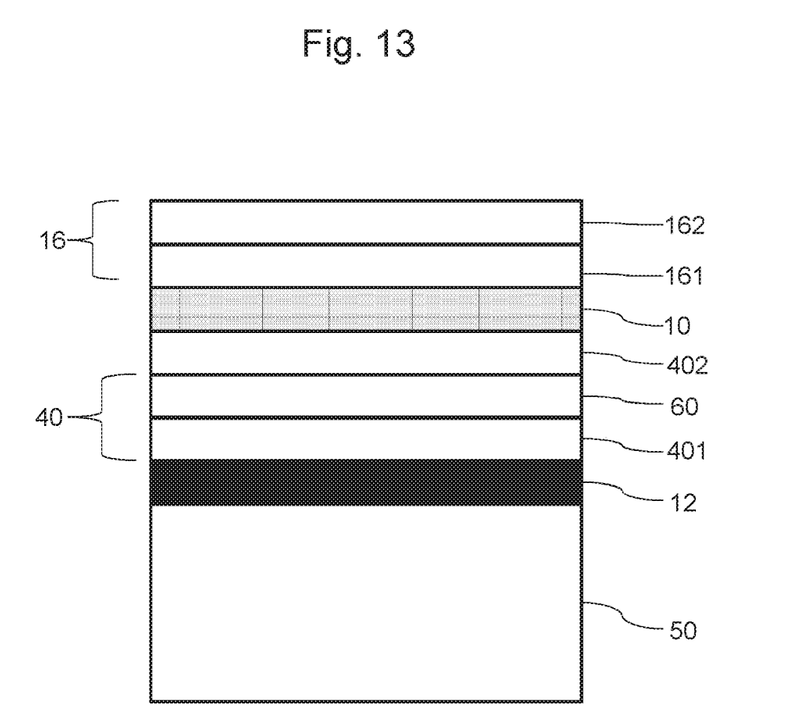
FIG. 13 shows an example stack comprising a layer of passive light absorber material provided within a spacer layer.
Figure 14:
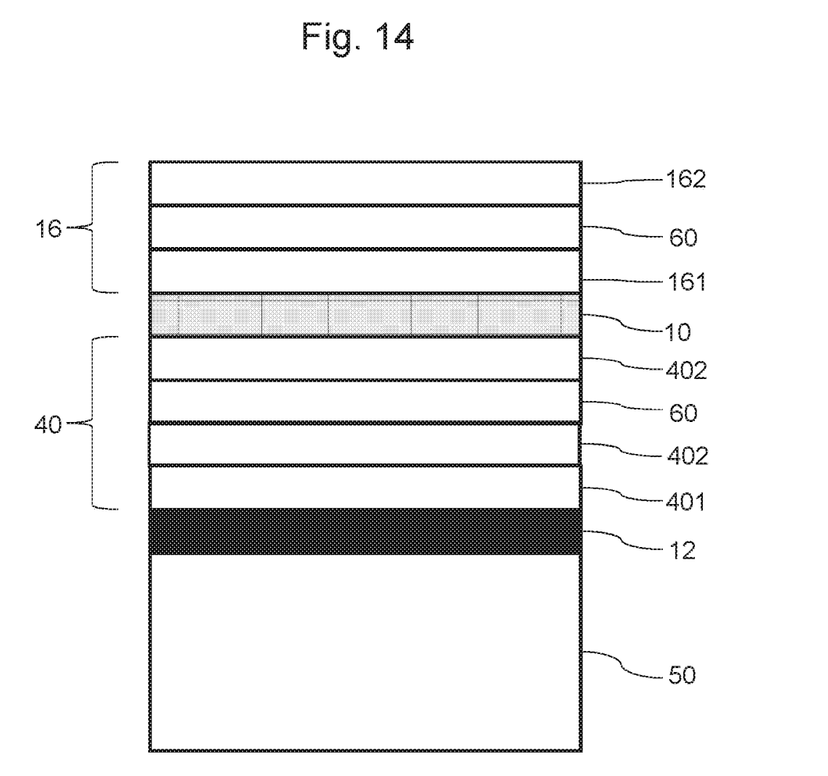
FIG. 14 shows an example stack comprising a layer of passive light absorber material provided within a capping layer and a layer of passive light absorber material provided within a spacer layer.

In still further embodiments, examples of which are depicted in FIGS. 12-14, the device further comprises a layer of passive light absorber material 60. The layer of passive light absorber material 60 may comprise a thin layer, or thin film, of light absorbing material. The layer of passive light absorber material 60 may be provided as part of the capping layer 16 (e.g. sandwiched between two capping layer sub-layers), directly adjacent to the capping layer 16 (whether or not the capping layer comprises a plurality of capping layer sub-layers), as part of the spacer layer 40 (e.g. sandwiched between two spacer layer sub-layers), and/or directly adjacent to the spacer layer 40 (whether or not the spacer layer comprises a plurality of spacer layer sub-layers).

Without wishing to be bound by theory, the inventors currently believe that the addition of such a layer of passive light absorber material both contributes to increased internal reflections at the interfaces of this layer, and preferentially absorbs light of wavelengths having standing wave antinodes on the cavity or multiple cavities provided by the other layers in the device at the location of the layer of passive light absorber material. This again may increase the colour selectivity of the reflection spectra of the multiple states of the device, expanding the range of achievable reflected colours and/or the independence of the colours reflected in each of the states. In an embodiment, the layer of passive light absorber material 60 is passive in the sense that it is not switchable between different states, for example in the same way as a PCM layer. The layer of passive light absorber material 60 does not contain any phase-change material. In an embodiment, the layer of passive light absorber material 60 is metallic, for example formed from a metallic material such as Ag, Au, Al or Pt. The layer of passive absorber material 60 is typically designed to be thick enough to cause the desired optical effect while not being so thick as to absorb or reflect large proportions of the incident light. 3 nm-30 nm has been identifies as an optimum range. To prevent oxidation of the layer of passive light absorber material 60 (e.g. in the case where the layer is formed from a metallic material prone to oxidation), a layer of a stable material may be deposited on one or both sides of the metallic layer. This layer may be thick enough (typically less than 10 nm) so as not to affect the reflection spectra produced by the device, or may be a thicker layer which itself contributes to the intended reflection spectra. Alternatively, the layer of passive absorber material 60 comprises a non-metallic absorber.

FIG. 12 shows an example stack having a layer of passive light absorber material 60. In this particular embodiment, the stack comprises a plurality of capping layer sub-layers 161-162. The layer of passive light absorber material 60 is provided within the capping layer, sandwiched between two of the capping layer sub-layers 161-162.

FIG. 13 shows a further example stack having a layer of passive light absorber material 60. In this particular embodiment, the stack comprises a plurality of spacer layer sub-layers 401-402. The layer of passive light absorber material 60 is provided within the spacer layer, sandwiched between two of the spacer layer sub-layers 401-402.

FIG. 14 shows an example stack having two layers of passive light absorber material 60. A first of the layers of passive light absorber material 60 is provided within the capping layer, sandwiched between two capping layer sub-layers 161-162. A second of the layers of passive light absorber material 60 is provided within a spacer layer, sandwiched between two spacer layer sub-layers 401-402.

Figure 4:
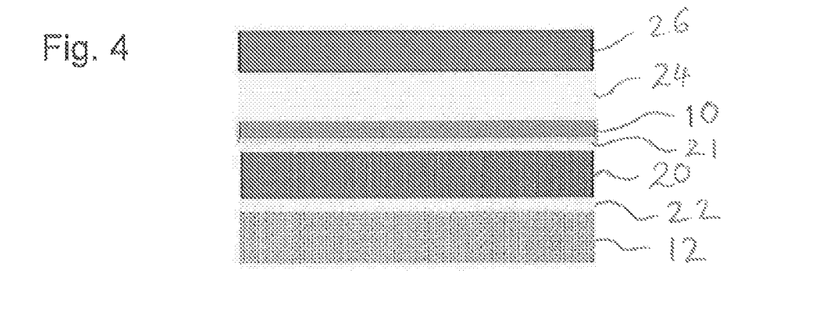
FIG. 4 is a schematic illustration in cross-section of another embodiment of the invention comprising a liquid crystal layer.

Another embodiment of the invention is illustrated in FIG. 4. In this embodiment, a layer of liquid crystal material is provided between the light absorber layer 10 and the reflective layer 12. A transparent electrode 21, 22 (made of e.g. ITO, 10 nm thick) is provided on each side of the liquid crystal cavity, as is known from the art of LCDs (liquid crystal displays). The device has a transparent top layer 24, for example made of ITO, silica, alumina, zinc sulfide, or polymeric material, and a polarizer 26. Applying an appropriate voltage to the electrodes 21, 22 will switch the orientation of the liquid crystal molecules to change the refractive index of the cavity, and thereby modulate the color of the device (which can be in the form of a thin film, and can be pixelated).

Conventional liquid crystal devices require a certain minimum thickness of 1 to 2 microns in order to work. This thickness is dictated by the equation:

$$d=\lambda/(4\Delta n)$$

where d is the minimum thickness, the wavelength, and $\Delta n$ the birefringence of the specific liquid crystal used in the device.

However, for the present embodiment of the invention, this equation is not applicable because the light is modulated by changing the refractive index of the nano-cavity (layer 20), and not by working on the phase of the light as in traditional LCD devices. The result is that the liquid crystal layer 20 can be about ten times thinner than conventionally, such as of the order of 200 nm. This means that the device can be made ultra-thin, and can switch at much higher speeds than conventional devices. Consequently, the device is advantageous for telecommunication applications. However, it can also be used for decorative applications that employ color modulation with low power consumption, or for passive, reflective-type displays. Reducing the thickness of the reflective layer 12 will enable color modulation in transmissive mode, and could be used as a color filter or tuneable broadband absorber for a spectrometer.

Figure 5:
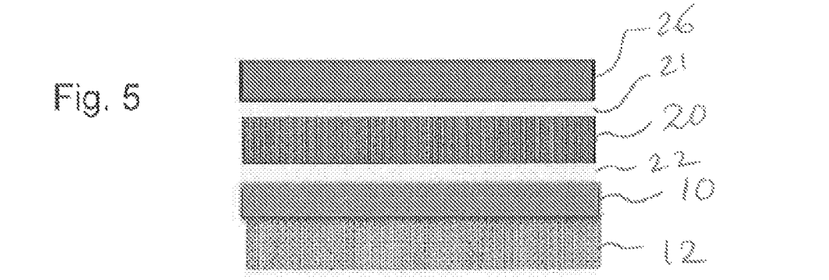
FIG. 5 is a schematic illustration in cross-section of a further embodiment of the invention comprising a liquid crystal layer.

FIG. 5 illustrates a variant on this embodiment in which the absorber layer 10 is adjacent to the reflective layer 12 to provide a 'leak-type' device similar to that of FIG. 1. The top layer 24 is not required.

In the devices according to the embodiments of FIGS. 4 and 5, the absorber layer 10, such as GST, is not required to be switchable nor to show a phase change, so does not need to be provided with its own electrodes. However, it can be preset in a desired phase.

Figure 6:
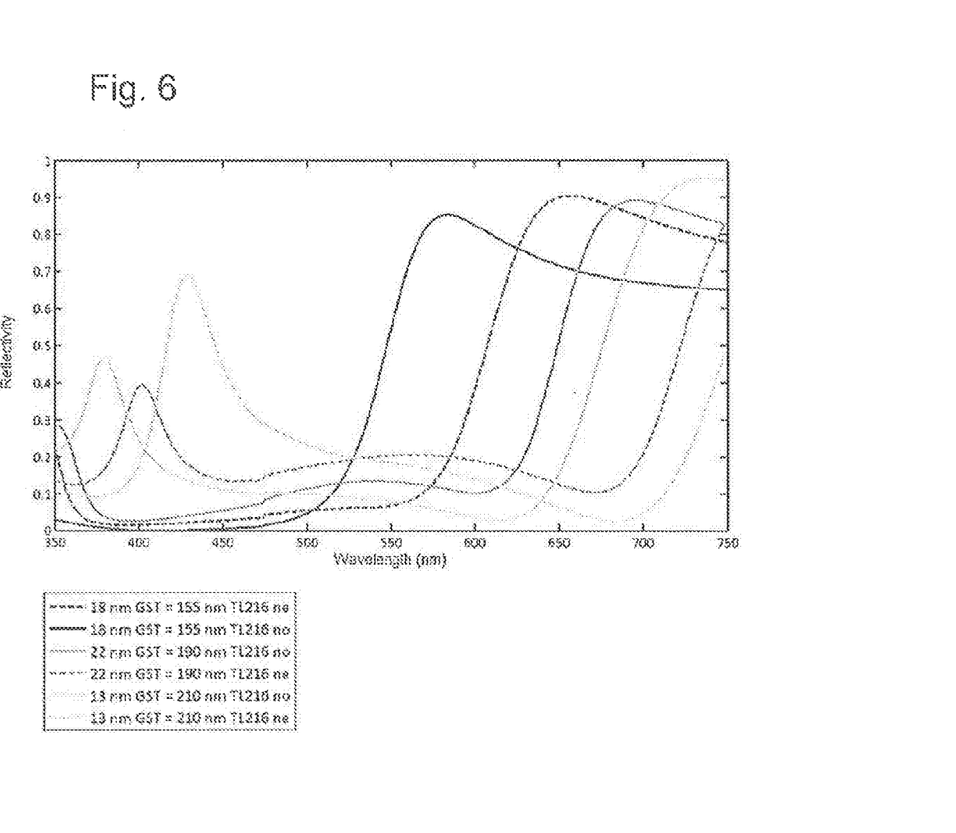
FIG. 6 shows plots of reflectivity against wavelength for devices according to an embodiment of the invention based on the structure of FIG. 4.

FIG. 6 shows the spectral response (in reflection) for a range of devices according to FIG. 4 comprising, in order, an ITO top layer 24, a GST absorber layer 10, an ITO electrode 21, a liquid crystal layer 20 of TL216, an ITO electrode 22, and a reflective layer 12 of Ag. The thicknesses of the GST and TL216 are as given in the legend of FIG. 6. For each pair of thicknesses, plots are shown for the liquid crystal TL216 with either the ordinary (no) or extraordinary (ne) refractive index, obtainable by switching the liquid crystal in an electric field applied by the electrodes 21, 22. As can be seen, significant spectral changes, and hence color changes, are apparent.

Figure 7:
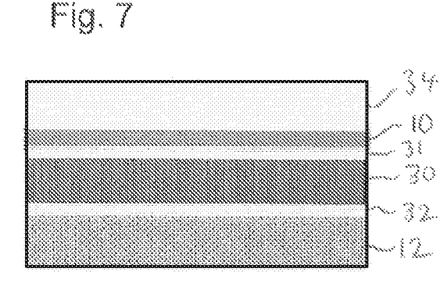
FIG. 7 is a schematic illustration in cross-section of an embodiment of the invention comprising an electro-optically active material layer.
Figure 8:
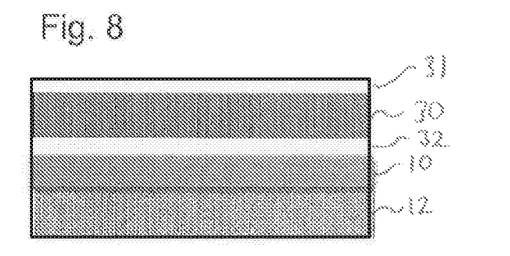
FIG. 8 is a schematic illustration in cross-section of a further embodiment of the invention comprising an electro-optically active material layer.

Further embodiments of the invention are illustrated in FIGS. 7 and 8. These structures are analogous to the devices of FIGS. 4 and 5 except that the liquid crystal layer is replaced by an electro-optically active material layer 30, referred to as the EO layer 30. A transparent electrode 31, 32 (made of e.g. ITO, 10 nm thick) is provided on each side of the EO layer. The device of FIG. 7 has a transparent top layer 34, for example made of ITO, silica, alumina, zinc sulfide, or polymeric material.

Electro-optically active materials change their refractive index based on the strength of an applied electric field. Examples of EO materials include: ammonium dihydrogen phosphate (ADP), potassium dihydrogen phosphate (KDP), lithium niobate, lithium tantalite, cadmium telluride, and various polymeric chromophores such as DANS, DR, FTC, CLD1, AJL8. Applying an appropriate voltage to the electrodes 31, 32 will switch the refractive index of the EO layer 30, and thereby modulate the color of the device (which can be in the form of a thin film, and can be pixelated).

The devices can employ very thin EO layers, such as in the range of 10 to 200 nm. This means that a high electric field to cause visible switching can be generated even with a relatively low voltage, such as 100 V or lower. Surface mount device DC-DC converters that operate up to 100 V are readily available. The EO materials are all highly insulating, so practically no current is circulating, even at high voltage. Therefore energy consumption is very low, even operating at high voltage, so battery operation is possible.

Switching speeds can also be incredibly high, such as 120 GHz, and lifetimes of huge numbers of switching cycles are achievable. Consequently, the device is advantageous for telecommunication applications. However, it can also be used for decorative applications that employ color modulation with low power consumption, or for displays. Reducing the thickness of the reflective layer 12 will enable color modulation in transmissive mode, and could be used as a color filter or tuneable broadband absorber for a spectrometer.

In the devices according to the embodiments of FIGS. 7 and 8, the absorber layer 10, such as GST, is not required to be switchable nor to show a phase change, so does not need to be provided with its own electrodes.

Figure 9:
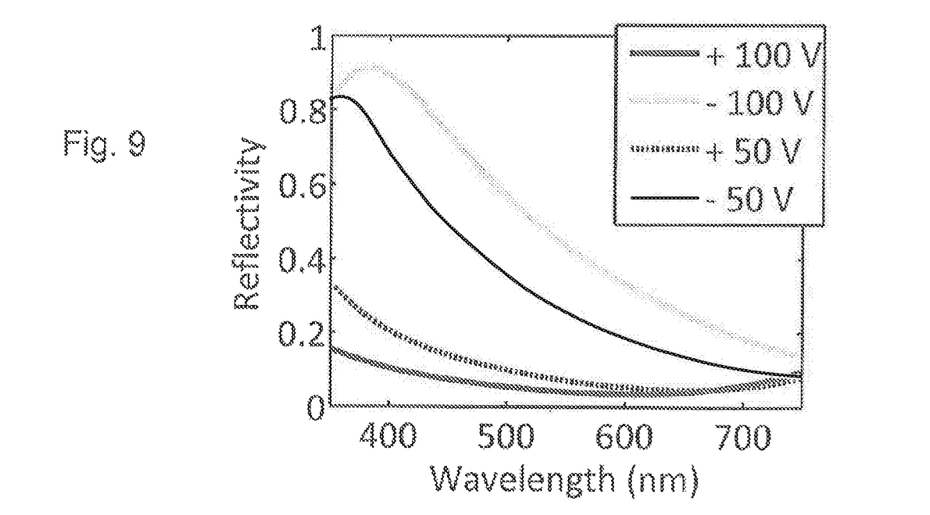
FIG. 9 shows plots of reflectivity against wavelength for a device with different applied voltages according to an embodiment of the invention based on the structure of FIG. 7.
Figure 10:
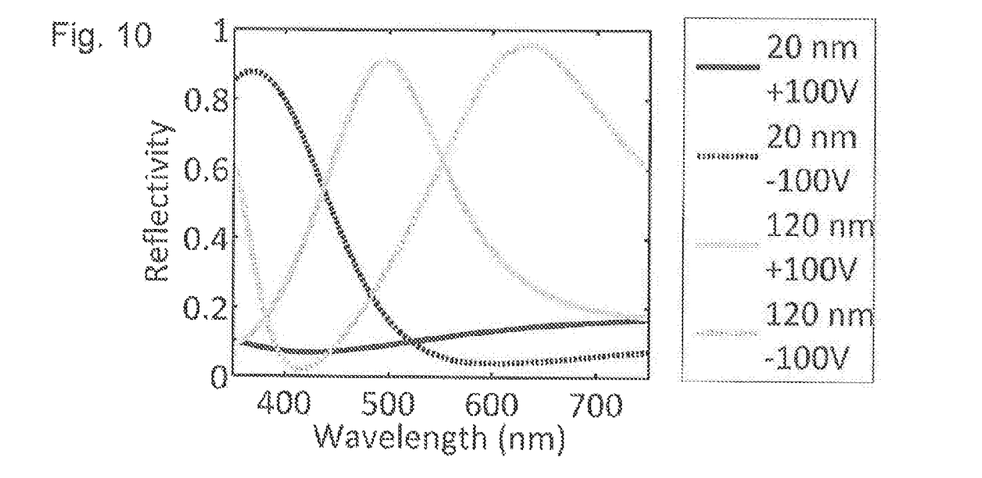
FIG. 10 shows plots of reflectivity against wavelength for devices according to an embodiment of the invention based on the structure of FIG. 7, with different applied voltages and different thickness of electro-optically active material layer.

FIG. 9 shows the spectral response (in reflection) for a device according to FIG. 7 comprising, in order, a 40 nm thick $SiO_2$ top layer 34, a 5 nm thick GST (amorphous) absorber layer 10, a 10 nm thick ITO electrode 31, a 20 nm $LiNbO_3$ EO layer 30, a 10 nm ITO electrode 32, and a 100 nm thick reflective layer 12 of Ag. The relatively flat spectra show a black to bright transition as the voltage is decreased from +100 V to −100 V. FIG. 10 shows spectral response for an example with the same structure as for FIG. 9, except the GST is 6 nm thick, and the EO layer 30 is CLD1 polymer in two examples with respective thicknesses of 20 nm and 120 nm. As can be seen, significant spectral changes, and hence color changes, are apparent with the switch from +100 V to −100 V.

In the preceding embodiments, the liquid crystal material and the EO material are both encompassed by the generic term of 'optically active material'.

Materials

In many applications, the light absorber material layer 10 does not specifically have to be a phase change material, although it can be. Examples of suitable materials for the absorber layer 10 include: any of the phase change materials mentioned below; plus amorphous silicon, amorphous carbon, Ge, GaAs, InAs, InP, CdTe, $Ag_2S$, organic semiconductors; any suitable material that absorbs light and can be deposited into films a few nm thick (semiconductor materials are typically ideal for this). The stoichiometry can be changed and doping can be used to create the desired absorber properties. In fact, it is not necessary to use materials that absorb light in the bulk state; such materials can be engineered to create metamaterials that have the desired properties in terms of absorption.

Many suitable phase-change materials are available, either separately or in combination, including compounds or alloys of the combinations of elements selected from the following list: GeSbTe, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb. It is also understood that various stoichiometric forms of these materials are possible; for example $Ge_xSb_yTe_z$; and another suitable material is $Ag_3In_4Sb_{76}Te_{17}$ (also known as AIST). Other suitable materials include any of the so-called "Mott memristors" (materials that undergo a metal-to-insulator transition, MIT, at some specific temperature), for example $VO_x$ or $NbO_x$. Furthermore, the material can comprise one or more dopants, such as C or N.

Such so-called phase-change material (PCM), undergoes a drastic change in both the real and imaginary refractive index when switched between amorphous and crystalline phases. The switching can be achieved for example by heating induced by suitable electric pulses or by a light pulse from a laser light source, or can be thermal heating for example using electrical resistive heating of an adjacent layer that is in thermal contact with the phase change material. There is a substantial change in the refractive index when the material is switched between amorphous and crystalline phases. The material is stable in either state. Switching can be performed an effectively limitless number of times. However, it is not essential that the switching is reversible.

A further enhancement applicable to all embodiments is that the material of the layer 10 does not have to be switched simply between a fully crystalline and a fully amorphous state. A mixture of phases can be achieved, such as 20% crystalline, 40% crystalline etc. The resulting effective refractive index of the material is somewhere between the two extremes of fully crystalline and fully amorphous depending on the degree of partial crystallisation. Between 4 and 8 distinct mixed phases can be readily achieved, having the corresponding number of different detectable reflectivities, but with appropriate control, the number can be much higher, such as 128.

Although some embodiments described herein mention that the material layer is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

In the preferred embodiment, the absorber material layer 10 is composed of is $Ge_2Sb_2Te_5$ (GST) less than 200 nm thick.

The reflective layer 12 is typically a thin metal film, composed for example of Au, Ag, Al, or Pt. If this layer is to be partially reflective then a thickness in the range of from 5 to 15 nm might be selected, otherwise the layer is made thicker, such as 100 nm, to be substantially totally reflective.

Figure 15:
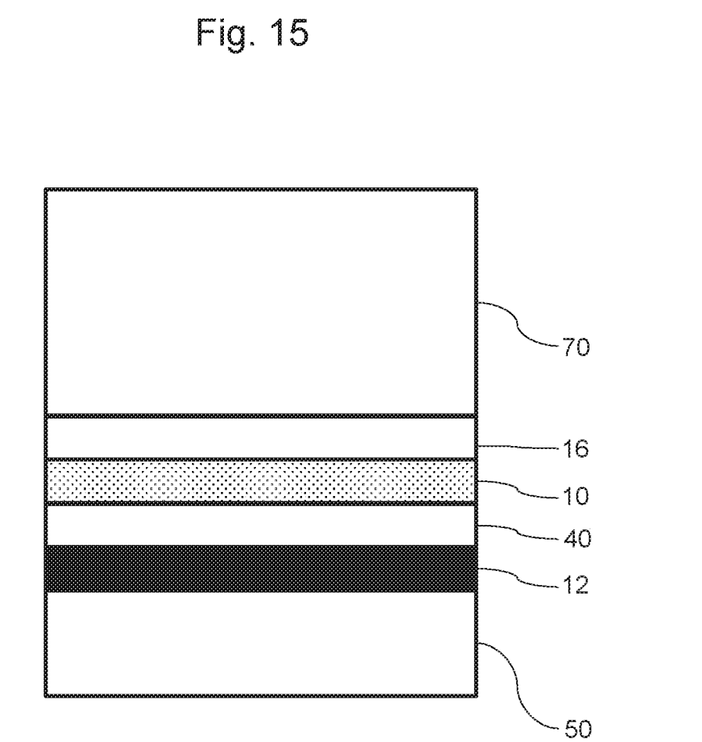
FIG. 15 shows an example stack formed on an optically thick cover sheet.

The whole structure shown in FIGS. 1, 4, 5, 7, 8, 11, 12, 13, 14 can be provided on a substrate 50 (shown for example in FIGS. 11-14) such as a glass, quartz, or plastics material, polycarbonate, PET etc., for ease of fabrication or structural robustness. The substrate 50 may be either optically thick, so as not to affect the reflection spectra, or be provided behind a fully opaque reflection layer 12. The layers are deposited using sputtering in the case of inorganic material layers such as the absorber material 10, ITO, $SiO_2$, and so on, which can be performed at a relatively low temperature of 100 C or even 70 C or lower. Polymeric layers can be formed by spin-coating and curing. Additional layers may also be provided as necessary. The low temperature process means that the optical device does not have to be fabricated at the same time as the article comprising the substrate (the article might be, for example, window glazing); the optical device can be retro-fitted as a surface coating applied later e.g. to existing windows or panels. Alternatively, the optically important layers may be deposited in reverse order onto a transparent, optically thick, superstrate (also referred to as optically thick cover layer 70), then optionally laminated or otherwise attached to an optional substrate 50 for further robustness or encapsulation. An example of such a configuration is shown in FIG. 15. In this particular example the stack comprises a capping layer 16, a layer of light absorber material 10, a spacer layer 40 and a reflective layer 12, but it will be understood that any of the stack configurations disclosed herein (including stacks having multiple capping layer sub-layers and/or multiple spacer layer sub-layers and/or one or more layers of passive light absorber material) may be formed on an optically thick cover layer 70 (with or without the additional substrate 50) in a corresponding manner. The substrate 50 and/or superstrate 70 may be rigid such as glass or silicon, or may be flexible such as polymer sheet or think flexible glass. The superstrate may optionally be coated with an antireflection film on the upper (viewer-side) surface for improved visibility of the coloured reflection generated by the device.

Applications

Optical devices according to any of the embodiments herein can be used as transmissive color (spectral) filters (either switchable or fixed), such as ultra-thin color filters for LCD/OLED displays and projectors. They can also be used in see-through displays, such as head-up displays (HUDs).

Optical devices according to any of the embodiments herein could be used as transmissive security marks, applied to articles, packaging, ID badges/passes, bank notes and so forth. A pattern can be stored in the phase change material layer by setting the crystallographic state of different regions. The pattern could simply be a recognisable image, or could encode specific information, such as being in the form of a bar code, QR code, or other suitable code. One of the advantages of the PCM based optical modulator is the potential for very high resolution patterns to be written into the device (c.f Nature 511, 206-211 (10 Jul. 2014)). This allows the possibility of holographic patterns to be used. Holographic patterns may be used to diffract incident light so as to form, with or without the assistance of additional lenses or other optical elements, a real image, multiple real images, or a three dimensional volumetric image, at some distance or set of distances from the device. Holographic patterns may also be used with the device to impart a beam steering, focusing, multiplexing or other optical effects on the input beam.

Figure 16:
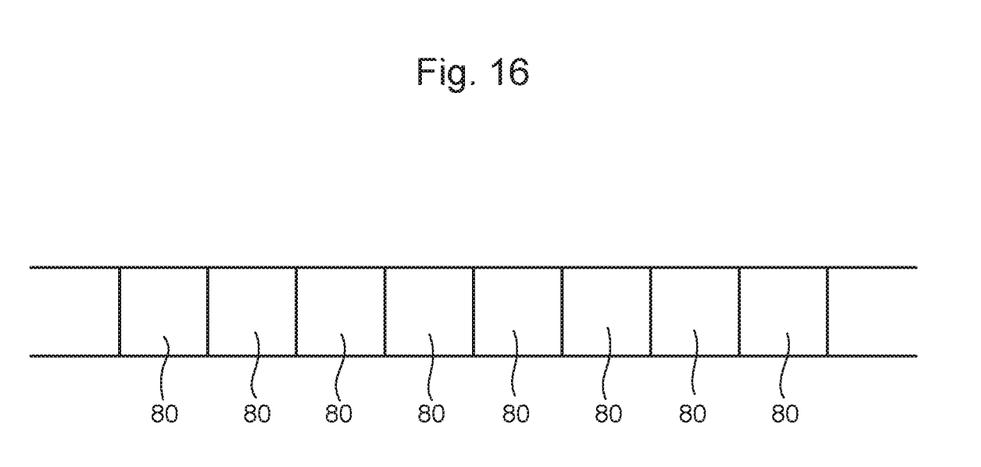
FIG. 16 shows a device having a plurality of regions providing different spectral responses.

In further embodiments of the invention, as depicted schematically in FIG. 16, the stack is configured to provide a plurality of different spectral responses to incident light in a corresponding plurality of different regions 80. In an embodiment, the different spectral responses are provided at least partly by configuring at least a subset of the regions 80 to have different sequences of layers (more or fewer layers and/or a different sequence of layer compositions and/or thicknesses) and/or different thicknesses of one or more corresponding layers (e.g. the same compositional sequence of layers but one or more of the layers in the sequence have different thicknesses in different regions). Alternatively or additionally, the different spectral responses are provided at least partly by configuring at least a subset of the regions 80 such that the layer of light absorber material is switched into different states, for example different phases. Each region may individually comprise any of the stacks disclosed herein. The plurality of regions 80 may form a subset of a larger plurality of regions (which may also be referred to as pixels). In an embodiment the device is configured to provide a holographic effect, for example a holographic pattern as described above, using the plurality of different spectral responses provided in the different regions.

In order to optimise the performance of the device for holographic applications, the configuration of the spacer, active and passive thin-film absorber, and capping layers may be adjusted so as to give high contrast modulation at the specific narrow band wavelengths intended for illumination of the device to reproduce the holographic effect. This high contrast modulation may be amplitude based (i.e. a strong change in the reflectivity at the specific wavelength bands) or it may be a large change (ideally $\pi$ or $2\pi$ radians) in the phase of light on reflection in the multiple states. Alternatively, the configuration of the optical layers may be specified so as to give sufficient modulation over a broad enough wavelength range to enable holographic effects over a range of wavelengths.

A pattern is not essential because one could just relying on the predetermined color change or spectral response intrinsic to the optical device that is difficult to replicate.

In one embodiment, the security mark is on a flexible substrate, such as a smart label or ID film, which can be bent to reveal a known change in color or to reveal a pattern to security personnel. The change in color and/or revelation of a pattern occurs because bending the device modifies the thickness of the layers, particularly the spacer layer, and so changes the spectral transmission response of the device.

A further variant is when the mark is defined using a pattern of mott memristor, such as $VO_x$ or $NbO_x$, as the phase change material. A change in color contrast occurs when the mark is heated above the transition temperature, so the security mark can be revealed by heating the device, and the mark disappears when it cools down again.

A device reader incorporating a simple spectrometer could assess the color variation of the mark at different angles (with or without bending) and compare that with a previously stored response to validate the authenticity of the mark with extremely high confidence.

Another device reader uses one or more low-power laser diodes to measure the transmissivity at fixed wavelength as a function of angle, and compares with a known response.

In the case of a pattern written into the mark, a device reader could include a camera to capture one or more images of the mark under particular illumination wavelengths or angles, and could employ contrast comparison and or image recognition to verify the mark.

With any of the security marks described above, the mark can, of course, be erased and/or rewritten using appropriate switching means, as previously described (such as laser, electric or thermal). This enables versatile security hierarchies, for example where the user's card is verified at a first checkpoint at which the device reader also writes second information to the mark. A second checkpoint then verifies that the second information is present and then erases and/or writes further information. In this way, the checkpoints can only be passed in sequence; and bypassing a checkpoint will cause access as subsequent checkpoints to be denied. The capability to write and re-write the pattern imposed on the device also allows the use of the device as a display or spatial light modulator, either for direct view, or to form an image at a distance from the device itself as part of a projection, or holographic projection system. When used as the light modulating element in a display system, the device may be configured to modulate a set of different wavelength bands in order to provide full-colour capability. This may be achieved either by providing multiple regions in the display with different configuration of the spacer, active and passive thin-film absorber, and capping layers for modulation of the different wavelength bands (i.e. sub-pixels within the display of different types), or the fast (typically sub-microsecond) switching capability of phase change material based devices may be used to provide modulation of a sequence of input colours time sequentially.

Although the spectra of FIGS. 2, 6, 9, 10 relate principally to the visible part of the electromagnetic spectrum, transmissive-type films can also be used to modulate other parts of the spectrum, such as infrared (IR) light. Thus, IR filters for transmission or reduction of particular bands can be fabricated. If a switchable absorber material layer 10 is used, then the device can be applied as a surface coating for glazing for thermal management e.g. for buildings. A large change in transmittance in the infrared part of the spectrum can be achieved between the amorphous and crystalline states of the absorber layer such that the change in total infrared energy transmitted through the device can be switched by more than 25%. Thus solar infrared light energy can be transmitted through the glazing to provide heating for the interior of the building, or the device can be switched to reflect more infrared to reduce unwanted heating of the interior of the building.

By appropriate choice of materials and layer thicknesses, the device can provide a large change across the infrared part of the spectrum, whilst only affecting the visible light to a much smaller degree. For example the total energy transmitted at the visible wave lengths may be effected by less than 20%. In this way, the brightness of visible light admitted into the building through the glazing can be maintained, while still unobtrusively regulating the heat energy (infrared) transmitted. In other words, the visible appearance does not necessarily change or appear tinted even when changing the infrared transmission.

Spectrometer

There is a type of spectrometer known as a broadband-filter-based spectrometer. Light representing the spectrum to be analysed is passed through a broadband filter with known transmission characteristics as a function of wavelength. Different bands are attenuated by different amounts and the resulting light reaches a single detector which provides a single resulting total intensity value. This process is repeated with multiple broadband filters, each of which modifies the spectrum in a different way. From the known transmission spectra of all of the broadband filters, and the intensity measurements, the original spectrum can be reconstructed computationally.

The spectrometer can be made more efficient by measuring the set of intensities simultaneously. One embodiment for doing this employs a substrate provided with a two dimensional array of detectors, such as charge-coupled devices (CCDs). In front of the detector array is a set of spectral filters each comprising a transmissive filter, such as previously described, with a partially-reflective layer. By adjusting the composition and/or thicknesses of the layers, the spectral transmission of each filter can be different.

There does not have to be one filter per detector, and instead one filter could serve multiple detector elements. Furthermore, the filters do not each have to be discretely fabricated.

This structure and technique makes the device simple to fabricate cheaply and quickly on a CCD array to provide a spectrometer-on-a-chip. The device can be used as a spectrometer for infrared and ultraviolet, as well as visible, and is stable on exposure to electromagnetic radiation across the spectrum. The number of different filters 34 and detectors 32 in the array can be of the order of a few hundred, or even many more, and this number will determine the spectral resolution. A spectral resolution of +/−1 nm can be achieved.

A further application of any of the devices described above is as a decorative layer. For example, the lenses of sunglasses can be provided coated with the optical device. The color and pattern could be predetermined and/or could be changed subsequently.

The invention claimed is:

1. An optical device comprising a stack of the following layers:
   a capping layer;
   a layer of light absorber material;
   a reflective layer; and
   a spacer layer between the reflective layer and the layer of light absorber material, wherein:
   the light absorber material is a phase-change material having a complex refractive index that is settable to at least two values which confer different optical properties to the device;
   one or more heating elements are provided to enable the refractive index of the phase change material to be altered by application of heat using electrical resistive heating; and
   the spacer layer comprises a plurality of spacer layer sub-layers, at least two of the spacer layer sub-layers having different refractive indices relative to each other.

2. The optical device of claim 1, wherein the refractive index of the capping layer is at least 1.6, preferably at least 1.8, more preferably at least 2.0, most preferably at least 2.2.

3. The optical device of claim 1, wherein the capping layer comprises at least one of $TiO_2$, ZnO, diamond, $SiO_2$, $Si_3N_4$, and TaO.

4. The optical device of claim 1, further comprising a spacer layer between the capping layer and the reflective layer.

5. The optical device of claim 1, wherein the thickness of the light absorber layer is at least 10 nm.

6. The optical device of claim 1, further comprising a layer of optically active material.

7. The optical device of claim 6, wherein electrodes are provided to enable the refractive index of the optically active material to be altered by application of a voltage.

8. The optical device of claim 6, wherein the optically active material is a liquid crystal material, and the stack further comprises a polarizer layer.

9. The optical device of claim 8, wherein the liquid crystal material layer is at most 300 nm thick.

10. The optical device of claim 6, wherein the optically active material is an electro-optically active material.

11. The optical device of claim 10, wherein the electro-optically active material layer is at most 100 nm thick.

12. The optical device of claim 1, wherein the capping layer comprises a plurality of capping layer sub-layers, at least two of the capping layer sub-layers having different refractive indices relative to each other.

13. The optical device of claim 1, wherein the light absorber material comprises a compound or alloy of a combination of elements selected from the following list of combinations: GeSbTe, $VO_x$, $NbO_x$, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb.

14. The optical device of claim 1, further comprising a layer of passive light absorber material, wherein the layer of passive light absorber material is not switchable between different states.

15. The optical device of claim 14, wherein the layer of passive light absorber material is metallic.

16. The optical device of claim 14, wherein the layer of passive light absorber material does not comprise any phase-change material.

17. The optical device of claim 14, wherein the layer of passive light absorber material is provided within the spacer layer, sandwiched between two of the spacer layer sub-layers, or the layer of passive light absorber material is provided directly adjacent to the spacer layer.

18. The optical device of claim 1, wherein the reflective layer is partially-reflective and the device is transmissive, or wherein the reflective layer is fully reflective.

19. The optical device of claim 1, wherein one or more of the layers comprise an optical cavity that determines the spectral response of the device to incident light.

20. The optical device of claim 1, wherein the layer of light absorber material comprises a plurality of regions, the complex refractive index of the phase-change material in each region being settable to at least two values independently of the phase-change material in each of the other regions.

21. The optical device of claim 1, wherein the stack is configured to provide a plurality of different spectral responses to incident light in a corresponding plurality of different regions.

22. The optical device of claim 21, wherein the different spectral responses are provided at least partly by configuring at least a subset of the regions to have different sequences of layers and/or different thicknesses of one or more corresponding layers.

23. The optical device of claim 21, wherein the different spectral responses are provided at least partly by configuring at least a subset of the regions such that the layer of light absorber material is switched into different phases.

24. The optical device of claim 21, wherein the device is configured to provide a holographic effect using the plurality of different spectral responses.

25. A display, a color display, a security mark, a color filter, a decorative layer, a spectrometer or a window comprising the optical device of claim 1.

26. An optical device comprising a stack of the following layers:
a capping layer;
a layer of light absorber material;
a reflective layer;
a spacer layer between the reflective layer and the layer of light absorber material; and
a layer of metallic passive light absorber material, wherein the layer of metallic passive light absorber material is not switchable between different states, further wherein:
the light absorber material is a phase-change material having a complex refractive index that is settable to at least two values which confer different optical properties to the device;
the spacer layer comprises a plurality of spacer layer sub-layers, at least two of the spacer layer sub-layers having different refractive indices relative to each other; and
the layer of passive light absorber material is provided within the spacer layer, sandwiched between two of the spacer layer sub-layers, or the layer of passive light absorber material is provided directly adjacent to the spacer layer,
wherein the stack is configured to provide a plurality of different spectral responses to incident light in a corresponding plurality of different regions.

27. The optical device of claim 26, wherein one or more electrodes are provided to enable the refractive index of the phase change material to be altered by application of a voltage.

28. The optical device of claim 26, wherein one or more heating elements are provided to enable the refractive index of the phase change material to be altered by application of heat.

* * * * *